3,422,011
FOAM PRODUCING MATERIAL
John F. Jackovitz, Morton Grove, Ill., and Will B. Jamison, Wyckoff, N.J., assignors, by mesne assignments, to Walter Kidde & Company, Inc., a corporation of Delaware
No Drawing. Continuation of application Ser. No. 315,664, Oct. 11, 1963. This application May 3, 1966, Ser. No. 547,185
U.S. Cl. 252—3  5 Claims
Int. Cl. A62d 1/00

ABSTRACT OF THE DISCLOSURE

A foam concentrate is described which comprises an ethoxylated alkyl sulfate salt, an aliphatic alcohol such as myristyl or lauryl alcohol which acts as a foam stabilizer, and a diether monohydric alcohol which acts as a leveling agent to reduce the weight of the foam and improve the drainage characteristics.

---

This application is a continuation of our copending application Ser. No. 315,664, filed Oct. 11, 1963 now abandoned.

This invention relates to an improved foam producing material, and more particularly to a foam producing concentrate adapted to be mixed with a liquid to form a solution which then is gas expanded to form a stable, high expansion foam particularly suitable for extinguishing fires of various types.

Heretofore, foams of various types have been employed for extinguishing fires of various kinds including mine fires, petroleum field fires and the like which must be brought under control from a distance. In copending application Ser. No. 13,103, filed Mar. 7, 1960, in the name of Will B. Jamison and entitled "Fire Fighting Foam Generator," there is disclosed suitable apparatus for generating a water-containing air-foam solution in sufficient quantity and at an adequate rate for use in fighting fires. This apparatus employs a foam forming concentrate which is mixed with water to form an aqueous solution. The aqueous solution is then gas expanded to form the foam. Expansion ratios of approximately 30/1 to 2000/1 are achieved. During its formation, the foam retains a certain amount of the water which is subsequently used to effect a smothering action on the fire. This does not mean that the foam "wets" the fire, but rather that sufficient water accompanies the foam so that it will vaporize, forming a blanket of steam which, in turn, is confined by the foam in the vicinity of the fire, to deprive the fire of the necessary amount of oxygen to sustain combustion. Should the foam material lack sufficient water content, it is less effective and it will therefore not function as satisfactorily in extinguishing the fire.

As mentioned above, the apparatus described in the aforementioned copending application Ser. No. 13,103, mixes an aqueous solution of a foam producing "concentrate" with air to produce the required air-foam solution. Heretofore, the "concentrate" has included a foaming agent and a stabilizing additive.

As disclosed in U.S. Patent No. 3,186,943, issued June 1, 1965, the foaming agents comprise an alkoxylated alkyl sulfate radical coupled with a suitable cation radical and having the empirical formula $$[R_a-(OR_b)_n-SO_4]-X$$

wherein: 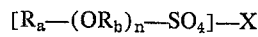

$R_a$ is an aliphatic alcohol derivative having from 10 to 20 carbon atoms;

$R_b$ is selected from the class consisting of ethylene, trimethylene and methylethylene;

$n$ varies from 1 to 4; and

X is a cation radical selected from the class consisting of ammonium, alkali metals, alkaline earth metals and alkanolamine cation radicals.

Preferably, X is selected from the class consisting of ammonium, magnesium, calcium, potassium, sodium, monoethyl amine, diethanol amine and triethanol amine radicals.

The stabilizing additive may consist of aliphatic alcohols such as lauryl and myristyl. The stabilizing additives improve the water retentiveness of the foam, i.e., reduces the rate at which the water drains from the foam mass. Since the water is retained for a longer period of time, the foam may be propelled over longer distances and still be effective to smother the fire covered thereby.

Heretofore, a typical "concentrate" was provided by dissolving the foaming agent or solution thereof in sufficient water to provide a solution containing from about 6% to about 25% by weight of the foaming agent. To this solution, there is added sufficient stabilizing additive to provide the desired drainage rate. The stabilizing additive can be added to the solution of foaming agent and water to provide a concentrate having from about 1% to about 10% by weight stabilizing agent.

The concentrate is then mixed with additional water to provide an aqueous foam producing solution which is about 3% to 6% by weight of the concentrate.

Heretofore, it has been shown that by increasing the concentration of the stabilizing additive, the drainage rate of the resulting foam is reduced. However, accompanying the reduction in the drainage rate was an increase in the foam weight. As should be evident, the case with which a foam mass is propelled is directly proportional to its weight. Accordingly, some intermediate drainage rate normally was chosen wherein the corresponding foam was of a weight suitable for relatively easy propulsion. Heretofore, then, in determining the desired drainage rate the weight of the resulting foam normally had to be taken into account.

Another disadvantage of these concentrates was their lack of cold weather resistance, i.e., the foaming agents would precipitate out of solution as the storage temperature was lowered. Hence, these concentrates, normally, were stored indoors where some control of the temperature was available.

The desirable features of good foam producing concentrates are as follows: (1) capable of producing relatively lightweight foams which can be easily propelled to the site of a fire; (2) capable of producing a foam having a drainage rate which can be controlled by the addition of a stabilizing additive; (3) concentrates which may be stored indoors or outdoors, i.e., concentrates whose freezing points can be controlled; (4) capable of producing foams whose weights remain relatively constant regardless of the concentration of the stabilizing additive; and (5) a viscosity approaching that of water whereby the concentrates may be easily pumped.

In the present invention, then, foam producing concentrates are provided for generating foams suitable for use in extinguishing fires. These foam producing concentrates consist of a foaming agent which preferably is magnesium lauryl ether sulfate; a stabilizing additive, such as, lauryl or myristyl alcohols; and as an essential additament an additive which may be aptly termed a "leveling additive."

Ammonium lauryl ether sulfate as well as sodium, calcium and potassium lauryl ether sulfates produce excellent foams when used in conjunction with the present leveling additives. However, it has been found that concentrates consisting of magnesium lauryl ether sulfate, a stabilizing additive and the present leveling additive produce foams which are superior with respect to all of the above-enumerated desirable features.

According to the present invention, foams now can be generated which are lower in weight and which have lower drainage rates. For example, it has been discovered that upon adding the present leveling additive to a foam producing concentrate, the weight of the resulting foam is decreased. The foam weight continually decreases as the concentration of the leveling additive is increased from zero to about 150 mg. per 100 ml. of the foam producing solution. Accompanying the decrease in foam weight is a reduction in the drainage rate of the resulting foam. When, however, the concentration of the leveling additive is increased beyond about 150 mg. per 100 ml. of foam producing solution, the weights of the resulting foams are leveled, i.e., they remain relatively constant substantially without regard to the concentration of the stabilizing additive which, in the absence of the present leveling additive is known to effect an increase in the foam weight when its concentration is increased.

Hence, the present leveling additive is useful in two respects, that is, it may be used to reduce the foam weight when desired; and it may be used to level the foam weight. Thus, it is now possible to take full advantage of the reduction in the drainage rate provided by the stabilizing additives without having the disadvantage of increased foam weight. It also should be noted that at a given concentration of the stabilizing additive, increasing the concentration of the present leveling additive also effects a reduction in the drainage rate, as will be shown.

The concentration of the present invention when agitated, produce a very unstable foam, the bubbles of which quickly coalesce and breakdown. The poor foaming quality of the present concentrates is attributed to the presence of the leveling additive. That is to say, that in the concentrates, the leveling additive is present in a considerable quantity and serves to depress foaming. However, when the concentration of the leveling additive is reduced by the addition of water, as in the preparation of the foam producing solution, the leveling additive does not effect the foamability, since, as will be shown, excellent foams can be produced. Consequently, the present concentrates have the desirable feature of being poor foamers and therefore may be handled, i.e., poured into drums, tankcars and the like as well as transported, without fear of producing an undesirable foam.

The term "activity" is defined as the amount of the foaming agent present in the foam producing concentrate, expressed in percent by weight. The term "injection rate" is defined as the amount of the foam producing concentrate present in the foam producing solution, expressed in percent by weight. The term "final activity" is defined as the amount of the foaming agent present in the foam producing solution, expressed in percent by weight, and equals the product of the "activity" of the concentrate and the "injection rate" of the foam producing solution.

Tests have shown that when the concentrates disclosed in U.S. Patent No. 3,186,943 are used, such as those formed from ammonium lauryl ether sulfate, lauryl alcohol and water, the capacity of the foam-generating apparatus begins to be affected as the final activity of the foaming agent approaches about 0.25% by weight—this being based on the preferred injection rates of 1.5% by weight. Accordingly, the minimum possible activity of the concentrate, based on a 0.25% by weight final activity and on an injection rate of 1.5% by weight, is approximately 16.7% by weight.

In the present invention, concentrates consisting of ammonium lauryl ether sulfate, lauryl alcohol, a leveling additive and water show similar results, i.e., the minimum activity of the concentrate is approximately 16.7% by weight. However, when the ammonium lauryl ether sulfate is replaced by magnesium lauryl ether sulfate, the capacity of the foam-generating apparatus is not affected until the final activity approaches about 0.15% by weight. Hence, the practical minimum activity of the foam producing concentrate containing magnesium lauryl ether sulfate, based on a 0.18% by weight final activity and on the preferred injection rate 1.5% by weight, is approximately 12% by weight.

The foam producing concentrates are capable of making excellent foam with water of varying hardness, and are capable of producing foam with water ranging in hardness even as high as sea water. Consequently, our invention is readily adapted for maritime use since sea water can be used as the water medium for producing foam.

In addition to aforementioned possible uses of the present form producing concentrates, it is also possible to use the foams produced for decontaminating enclosures by removing airborne radioactive particles by aspirating the volume of air containing the radioactive material into the bubbles for a sufficient period to effect eventual "wetting" thereof. Thus, when the bubbles burst or drain, the wetted contaminants accompany the liquid phase and are carried down to the floor of the enclosure and are thereby transferred, virtually completely, from airborne dispersion to a surface collection which can be washed easily away.

Accordingly, the primary objects of the present invention include:

To provide foam producing concentrates having as an essential additament a leveling additive which concentrates are capable of producing lighter weight foams than heretofore possible. Accordingly, the resulting foams are exceedingly easier to propel and may be propelled to the site of the fire much more quickly than foams heretofore available.

To provide foam producing concentrates having as an essential additament a leveling additive which concentrates are capable of producing foams having drainage rates which are lower than the drainage rates of the foams heretofore available. Consequently, foams now can be generated which retain a higher percentage of the original water and which are therefore more effective in controlling fires.

To provide foam producing concentrates having as an essential additament a leveling additive which lowers the freezing points of the concentrate. Consequently, low temperature formulations of the present foam producing concentrates can be provided which may be stored outdoors without fear of freezing.

To provide a foam producing concentrate having as an essential additament a leveling additive which produces a "leveling effect" on the foam weight, i.e., it maintains the foam weight relatively constant regardless of the concentration of the stabilizing additive. Consequently, it is no longer necessary to take into account the foam weight when determining the desired drainage rate.

To provide foam producing concentrates having as an essential additament a leveling additive which concentrates are substantially unaffected by the hardness of the water employed in diluting the concentrates. Hence, the present foam producing concentrates are equally as useful with relatively soft water as well as hard water ranging in hardness up to sea water.

Finally, to provide foam producing concentrates having as an essential additament a leveling additive which concentrates produce foams suitable for decontaminating enclosures by removing airborne radioactive particles.

The leveling additives provided by the present invention are diether monohydric alcohols having the empirical formula

R—OR′—OR″—OH wherein:

R is an aliphatic radical selected from the class consisting of methyl, ethyl, propyl, isopropyl, butyl and isobutyl radicals; and R′ and R″ are aliphatic radicals selected from the class consisting of ethyenyl, propenyl, and isopropenyl radicals.

Examples of leveling additives which are useful in the present invention are:

(1) diethylene glycol monomethyl ether;
(2) diethylene glycol monoethyl ether;
(3) diethylene glycol monobutyl ether;
(4) dipropylene glycol monoethyl ether;
(5) 1-butoxyethoxy-2-propanol.

The above-cited leveling additives possess the following properties which make them excellent for use in foam producing solutions. These properties are: compatibility with the system, that is, they will not affect the foaming property of the foaming agent; relatively high flash points, normally above 150° F.; relatively low viscosity so that the flow properties of the foam producing solution is not adversely affected; relatively low freezing points; and they are at least moderately miscible in water.

Other chemicals which fall in the same class as the present leveling additives but which are not suitable for use in the present invention, are the monoether monohydric alcohols, examples of which are:

ethylene glycol mononethyl ether;
ethylene glycol monoethyl ether;
ethylene glycol monobutyl ether;
ethylene glycol monohexyl ether; and
propylene glycol monomethyl ether.

These chemicals are not useful in the present invention for one or more of the following reasons: high vapor pressure; relative low flash point, i.e., less than 150° F.; relatively high viscosity; and relatively low miscibility in water. Tests have shown that the monoethers are in fact foam killers, i.e., the foams produced therefrom are not even relatively stable.

Still other chemicals which fall in the same class as the present leveling additives are the triether monohydric alcohols, examples of which are:

triethylene glycol monobutyl ether; and
triethylene glycol monoethyl ether.

These chemicals are not particularly suitable as leveling additives since they have a relatively high viscosity and a relatively high freezing point. These properties make the chemicals useful as leveling additives only at moderately high temperature formulations, i.e., greater than approximately +35° F. Their relatively high viscosities make them unsuitable for use in temperature formulations much below +35° F. since they become increasingly difficult to pump.

FOAM GENERATING PROCEDURE

The procedure employed in producing the foams was accomplished as follows. A suitable quantity of the lauryl ether sulfate, lauryl alcohol, solvent 1-butoxyethoxy-2-propanol were diluted in three gallons of water. The resulting aqueouss solutions were gas expanded by means of a nozzle of predetermined size and configuration with air at a rate of 3.3 c.f.m. The aqueous solution was foamed at the rate of 3.5 g.p.m. The foam produced thereby was poured into a drum having a volume of 2.8 cu. ft. or 79 liters. The foam was permitted to overflow the drum at which time a blade was passed across the top of the drum to wipe off the excess foam. The outer surface of the drum was dried, the drum was placed on a scale, and the initial foam weight was noted. At the end of predetermined time periods, namely, four, seven, ten, fifteen and thirty minutes, liquid was drained from the drum, the volume (ml.) was noted. Where possible two runs were made from each sample mixture.

In the following examples, the marked improvement in foam weight and drainage rate as well as aforementioned leveling effect will become readily apparent.

AMMONIUM LAURYL ETHER SULFATE

For the purpose of comparison the following four examples are presented wherein the foaming agent consists of 29% aqueous ammonium lauryl ether sulfate and the stabilizing additive consists of lauryl alcohol. No leveling additive was used in these runs. In all of these examples, 183 grams of the foaming agent, which consisted of 53 gms. ammonium lauryl ether sulfate and 130 gms. water, plus certain amounts of lauryl alcohol, as specified below, were diluted in 3.5 gals. of tap water. The results of these tests are as follows:

| Examples | (1) | (2) | (3) | (4) |
|---|---|---|---|---|
| Stabilizing Additive, gms | 2.6 | 4.0 | 5.3 | 6.7 |
| Concentration, mg./100 ml. of tap water, of— | | | | |
| Foaming Agent | 400 | 400 | 400 | 400 |
| Stabilizing Additive | 20 | 30 | 40 | 50 |
| Avg. Initial Foam Weight, gm./liter | 2.50 | 2.48 | 2.79 | 3.53 |
| | Foam Remaining, wt. percent of initial foam weight | | | |
| Drain Time, min.: | | | | |
| 4 | 30 | 84 | 88 | 88 |
| 7 | 17 | 63 | 69 | 70 |
| 10 | 12 | 52 | 55 | 57 |
| 15 | 8 | 43 | 41 | 44 |
| 30 | 6 | 21 | 23 | 25 |

As can be seen, the reduction in drainage rate, as evidenced by the wt. percent of initial foam weight left, is accompanied by an increase in the initial foam weight.

The following Examples (5), (6) and (7) represent concentrates wherein the foaming agent was a 55.8% magnesium lauryl ether sulfate solution, the stabilizing additive was lauryl alcohol and the leveling additive was 1-butoxyethoxy-2 propanol. The foaming agent consisted of:

55.8% magnesium lauryl ether sulfate
5.1% 1-butoxyethoxy-2-propanol
39.1% water.

In all of these tests, 84 gms. of the foaming agent, consisting of 46.9 gms. magnesium lauryl ether sulfate, 4.3 gms. 1-butoxyethoxy-2-propanol and 32.7 gms. water, plus certain amounts of lauryl alcohol, as specified below, were diluted in 3.0 gals. of tap water. The results of these tests are as follows:

| Examples | (5) | (6) | (7) |
|---|---|---|---|
| Stabilizing Additive, gm | 3.4 | 4.6 | 6.8 |
| Concentration, mg./100 ml. of tap water, of— | | | |
| Foaming Agent | 400 | 400 | 400 |
| Leveling Additive | 38 | 38 | 38 |
| Stabilizing Additive | 30 | 40 | 60 |
| Avg. Initial Foam Weight, gm./liter | 2.37 | 2.60 | 3.15 |
| | Foam Remaining, wt. percent of initial foam weight | | |
| Drain Time, min.: | | | |
| 4 | 91 | 93 | 89 |
| 7 | 68 | 74 | 65 |
| 10 | 50 | 60 | 54 |
| 15 | 35 | 45 | 39 |
| 30 | 18 | 21 | 18 |

As can be seen, the reduction in drainage rate, as evidenced by the weight percent of intial foam weight, is accompanied by an increase in the initial foam weight when the leveling agent is present at a low concentration.

The following Examples (8) to (10) and (11) to (13) represent concentrates wherein the foaming agents were 29% aqueous ammonium lauryl ether sulfate and 29% aqueous magnesium lauryl ether sulfate, respectively. In each of these examples the stabilizing additive was lauryl alcohol and the leveling additive was 1-butoxyethoxy-2-propanol. In preparing the solutions of Examples (8) to (13), 157 gms. of the 29% aqueous foaming agent, 80 gms. of the leveling additive, plus certain amounts of lauryl alcohol, as specified below, were diluted in 3.0 gals. of tap water. The results are as follows:

| Examples | (8) | (9) | (10) | (11) | (12) | (13) |
|---|---|---|---|---|---|---|
| Stabilizing Additive, gm. | 3.4 | 4.6 | 6.8 | 3.4 | 4.6 | 6.8 |
| Concentrations, mg./100 ml. of tap water, of— | | | | | | |
| Ammonium Lauryl Ether Sulfate | 400 | 400 | 400 | | | |
| Magnesium Lauryl Ether Sulfate | | | | 400 | 400 | 400 |
| Leveling Additive | 700 | 700 | 700 | 700 | 700 | 700 |
| Stabilizing Additive | 30 | 40 | 60 | 30 | 40 | 60 |
| Avg. Initial Foam Weight, gm./liter | 2.15 | 2.12 | 2.18 | 1.77 | 1.78 | 1.81 |
| Foam Remaining, wt. percent of initial foam weight | | | | | | |
| Drain Time, min.: | | | | | | |
| 4 | 96 | 96 | 96 | 94 | 94 | 98 |
| 7 | 86 | 88 | 86 | 81 | 82 | 88 |
| 10 | 74 | 72 | 77 | 68 | 70 | 76 |
| 15 | 55 | 59 | 61 | 54 | 56 | 58 |
| 30 | 26 | 31 | 42 | 24 | 29 | 35 |

By comparison of Examples (1) to (4) with Examples (8) to (10) all of which employed ammonium lauryl ether sulfate, and by comparison of Examples (5) to (7) with Examples (11) to (13) all of which employed magnesium lauryl ether sulfate, it will be noted that a significant reduction has been achieved in both the initial foam weight and the drainage rate. It should be noted that in the case of the magnesium salt, when the leveling additive is present in a high concentration as in Examples (11) to (13), a greater reduction is achieved in the initial foam weights and drainage rates than when the leveling additive is present in a low concentration as in Examples (5) to (7). Furthermore, the leveling additive reduces the foam weights of the magnesium foaming agent, Examples (11) to (13), to a greater extent than the foam weights of the ammonium foaming agent, Examples (8) to (10), while the drainage rates are approximately the same. Hence, with respect to foam weight and drainage rates, the magnesium lauryl ether solvent is the preferred foaming agent.

In addition to the ammonium and magnesium salts, the salts of lauryl ether sulfate obtained from sodium, calcium and potassium were investigated, each salt being in the form of a 29% aqueous solution. In preparing the solutions of the sodium salt Examples (14) to (16) and calcium salt Examples (17) to (18), 157 gms. of the 29% aqueous salt solution, 80 gms. of 1-butoxyethoxy-2-propanol as the leveling additive, plus certain amounts of lauryl alcohol, as specified below, were diluted in 3.0 gals. of tap water. The results are as follows:

| Examples | (14) | (15) | (16) | (17) | (18) | (19) |
|---|---|---|---|---|---|---|
| Stabilizing Additive, gm. | 3.4 | 4.6 | 6.8 | 3.4 | 4.6 | 6.8 |
| Concentrations, mg./100 ml. of tap water, of— | | | | | | |
| Na Lauryl Ether Sulfate | 400 | 400 | 400 | | | |
| Ca Lauryl Ether Sulfate | | | | 400 | 400 | 400 |
| Leveling Additive | 700 | 700 | 700 | 700 | 700 | 700 |
| Stabilizing Additive | 30 | 40 | 60 | 30 | 40 | 60 |
| Initial Foam Weight, gm./liter | 2.21 | 2.12 | 2.30 | 2.06 | 1.67 | 1.84 |
| Foam Remaining, wt. percent of initial foam weight | | | | | | |
| Drain Time, min.: | | | | | | |
| 4 | 56 | 66 | | 31 | 86 | 99 |
| 7 | 37 | 38 | 96 | 18 | 60 | 87 |
| 10 | 28 | 26 | 84 | 12 | 49 | 73 |
| 15 | 20 | 20 | 66 | 6 | 35 | 55 |
| 30 | 12 | 8 | 37 | 0 | 20 | 30 |

As can be seen, certain of the initial foam weight compare favorably with those of Examples (8) to (13) although the drainage rates are somewhat higher.

In order to show the effect of leveling additive concentration on the initial foam weight, 157 gms. of 29% ammonium and sodium lauryl ether sulfate aqueous solutions, 4.6 gms. lauryl alcohol, plus certain amounts of the leveling additive 1-butoxyethoxy-2-propanol, as specified below, were diluted with 3.0 gals. of tap water. In the case of magnesium lauryl ether sulfate, a 55.8% magnesium salt solution was employed which consisted of:

55.8% magnesium lauryl ether sulfate,
5.1% 1-butoxyethoxy-2-propanol; and
39.1% water expressed in weight percent.

In preparing the solution of the magnesium foaming agent, 157 gm. of the magnesium salt solution consisting of 87.6 gms. magnesium lauryl ether sulfate, 8.0 gms. 1-butoxyethoxy-2-propanol and 61.4 gms. water, 4.6 gms. of lauryl alcohol; plus certain amounts of the leveling additive 1-butoxyethoxy-2-propanol were diluted with 3.0 gals. of tap water. These results are listed below as Examples (20) to (22):

| Examples | | (20) | (21) | (22) |
|---|---|---|---|---|
| Foaming Agents, salt of Lauryl Ether Sulfate | | Ammonium | Magnesium | Sodium |
| Concentrations, mg./100 ml. of tap water, of — | | | | |
| Foaming Agents | | 400 | 400 | 400 |
| Stabilizing Additive | | 40 | 40 | 40 |
| Leveling Additive, 1-butoxyethoxy-2-propanol | | Initial Foam Weight, gm./liter | | |
| Total gm. | Conc.* | | | |
| 0 | 0 | 4.05 | | 3.76 |
| 4.3 | 38 | | 2.77 | |
| 10.0 | 90 | 2.29 | 2.43 | 2.54 |
| 20.0 | 180 | 1.99 | 2.06 | 2.58 |
| 50.0 | 440 | 2.01 | | 1.79 |
| 80.0 | 700 | 2.12 | 1.78 | |
| 100.0 | 880 | 1.92 | | 2.09 |

*Concentration, mg./100 ml. of tap water.

As evidenced by the above data, the initial foam weight is substantially leveled beyond a leveling additive concentration of about 150 mg. per 100 ml. of tap water. Hence, for the purpose of reducing the initial weight of the foam, the leveling additive may be present from zero to about 17 percent by weight of the foam producing concentrate. Furthermore, the leveling additive may be present in an amount sufficient to produce leveling of the initial weight of the resulting foam. In this instance the leveling additive is present not substantially less than about 17 percent by weight of the foam producing concentrate and preferably in excess of 20 percent by weight of the foam producing concentrate.

The other useful leveling additives, mentioned above, were investigated and found to produce foams whose initial weight and drainage rate are comparable favorably with those of the foams wherein 1-butoxyethoxy-2-propanol was employed, as evidenced below in Examples (23) to (27).

For the purpose of simplifying the summary of these data, the following letter symbols will be employed to identify the leveling additives:

Symbol:                Leveling additive
V _____ Diethylene glycol monomethyl ether.
W _____ Diethylene glycol monoethyl ether.
X _____ Diethylene glycol monobutyl ether.
Y _____ Dipropylene glycol monoethyl ether.
Z _____ 1-butoxyethoxy-2-propanol.

The foaming agent and stabilizing additive employed in these examples were magnesium lauryl ether sulfate and lauryl alcohol respectively.

| Examples | (23) | (24) | (25) | (26) | (27) |
|---|---|---|---|---|---|
| Foaming Agent: weight, gm | 45.4 | 45.5 | 45.5 | 45.5 | 45.5 |
| Conc., mg./100 ml. tap water | 400 | 400 | 400 | 400 | 400 |
| Stabilizing Additive, weight, gm | 5.7 | 9.1 | 5.7 | 5.8 | 5.7 |
| Conc., mg./100 ml. tap water | 50 | 80 | 50 | 50 | 50 |
| Leveling Additive, Type | V | W | X | Y | Z |
| Weight, gm | 121 | 97 | 121 | 105 | 121 |
| Conc., mg./100 ml. tap water | 1,060 | 850 | 1,060 | 910 | 1,060 |
| Diluted in, gal. | 3.0 | 3.0 | 3.0 | 3.0 | 3.0 |
| Initial foam weight, gm./liter | 2.53 | 2.50 | 1.79 | 2.22 | 1.95 |

| Drain Time, min.: | Foam Remaining, wt. percent of initial foam weight | | | | |
|---|---|---|---|---|---|
| 4 | 99 | 95 | 99 | 98 | 98 |
| 7 | 90 | 80 |  | 86 |  |
| 10 | 77 | 65 | 86 | 27 | 85 |
| 15 | 64 | 51 |  | 17 | 70 |
| 30 | 39 | 28 | 42 | 10 | 41 |

Foam producing concentrates wherein two leveling additives are employed also produce excellent foams. The following Examples (28) and (29) are illustrative of this fact. The leveling additives used in the examples were 1-butoxyethoxy-2-propanol (additive Z) and diethylene glycol monomethyl ether (additive V), while the foaming agent and stabilizing agent were magnesium lauryl ether sulfate and lauryl alcohol, respectively. The initial foam weights and drainage rates of these foams compare favorably with those of Examples (11) to (13) wherein only 1-butoxyethoxy-2-propanol was employed and even more favorably with those of Example (27). The use of two leveling additives is important from the standpoints of freezing temperature and viscosity. Through the addition of two leveling additives, the freezing temperature of the concentrate may be lowered, for example, to below −20° F. It should be noted, however, that while the freezing point has been lowered, the two leveling additives seem to favorably affect the viscosity whereby it is maintained approximately equal to that of water.

| Examples | (28) | | (29) | |
|---|---|---|---|---|
| Foaming Agent: | | | | |
| Weight, gm | 34.0 | | 34.0 | |
| Conc., mg./100 ml. tap water | 300 | | 300 | |
| Stabilizing Additive: | | | | |
| Weight, gm | 6.8 | | 8.0 | |
| Conc., mg./100 ml. tap water | 60 | | 70 | |
| Leveling Additive, Type | Z | V | Z | V |
| Weight, gm | 105.7 | 90.0 | 105.7 | 90.0 |
| Conc., mg./100 ml. tap water | 930 | 790 | 930 | 790 |
| Diluted in, gal. tap water | 3.0 | | 3.0 | |
| Initial Foam Weight, gm./liter | 1.85 | | 1.81 | |

| Drain Time, min.: | Foam Remaining, wt. percent of initial foam weight | |
|---|---|---|
| 4 | 92 | 99 |
| 7 | 79 | 92 |
| 10 | 64 | 80 |
| 15 | 50 | 64 |
| 30 | 30 | 42 |

Other formulations wherein two leveling additives are employed are illustrated by the following Examples (30) to (33).

| Examples | (30) | (31) | (32) | (33) |
|---|---|---|---|---|
| Formulation, ° F | +20 | +15 | +10 | −20 |
| Mg Lauryl Ether Sulfate, wt. percent | 28.8 | 25.6 | 20.7 | 10.6 |
| Lauryl Alcohol, wt. percent | 5.3 | 4.8 | 3.9 | 2.0 |
| 1-butoxyethoxy-2-propanol, wt. percent | 34.0 | 35.7 | 44.2 | 47.0 |
| Diethylene glycol monomethyl ether, wt. percent | 20.8 | 23.8 | 23.1 | 39.2 |
| Water, wt. percent | 11.1 | 10.1 | 8.1 | 4.1 |
| Cloud Point, ° F | +16 | +11 | +6 | −23 |

The 1-butoxyethoxy-2-propanol may be present from about 1.0 part by weight to about 4.6 parts by weight of the foaming agent and preferably from 1.1 parts by weight to 4.5 parts by weight of the foaming agent. Furthermore, the diethylene gycol monomethyl ether may be present from about 0.50 part by weight to about 0.9 part by weight of the 1-butoxyethoxy-2-propanol and preferably from 0.6 part by weight to 0.85 part by weight of the 1-butoxyethoxy-2-propanol. Also the ratio of 1-butoxyethoxy-2-propanol to diethylene glycol monomethyl ether may be from about 1:1.0 to about 1:2.0 and preferably from about 1:1.1 to about 1:1.95.

The one remaining desirable property of a foam producing concentrate is a low freezing point. A good indication of freezing is the cloud point of a solution, that is, where the mixture begins to cloud indicating the freezing is taking place. The temperature at which clouding begins is employed to indicate the cloud point of a solution.

It has been found that magnesium lauryl ether sulfate provides a concentrate having a lower cloud point than the corresponding concentrate made from ammonium lauryl ether sulfate. This fact is shown in the following Tables I and II wherein Table I summarizes the cloud points of various aqueous solutions of ammonium lauryl ether, lauryl alcohol, and 1-butoxyethoxy-2-propanol; and wherein Table II summarizes the cloud points of various aqueous solutions of magnesium lauryl ether sulfate, lauryl alcohol, and 1-butoxyethoxy-2-propanol.

TABLE I.—CLOUD POINTS OF VARIOUS AQUEOUS SOLUTIONS OF AMMONIUM CONCENTRATES

| Sample | A | B | C | D | E | F | G |
|---|---|---|---|---|---|---|---|
| Foaming Agent, gm | 4.5 | 4.5 | 4.5 | 4.5 | 4.5 | 4.5 | 4.5 |
| Stabilizing Additive, gm | 0.5 | 0.5 | 0.5 | 0.5 | 0.5 | 0.5 | 0.5 |
| Water, gm | 1.5 | 2.5 | 2.9 | 5.0 | 8.0 | 12.5 | 15.0 |
| Leveling Additive: | | | | | | | |
| Gm | 20.5 | 19.5 | 18.5 | 15.5 | 12.5 | 8.0 | 5.5 |
| Wt. percent | 76.0 | 72.2 | 68.9 | 60.8 | 49.0 | 31.4 | 21.6 |
| Cloud Point, ° F | +17 | −2 | −2.5 | +5 | +18 | +17 | +20 |

TABLE II.—CLOUD POINTS OF VARIOUS AQUEOUS SOLUTIONS OF MAGNESIUM CONCENTRATES

| Sample | A | B | C | D | E | F | G | H |
|---|---|---|---|---|---|---|---|---|
| Foaming Agent, gm | 5.4 | 5.4 | 5.4 | 5.4 | 5.4 | 5.4 | 5.4 | 5.4 |
| Stabilizing Additive, gm | 1.0 | 1.0 | 1.0 | 1.0 | 1.0 | 1.0 | 1.0 | 0.5 |
| Water, gm | 3.0 | 5.0 | 7.0 | 8.4 | 10.4 | 11.4 | 13.4 | 18.1 |
| Leveling Additive: | | | | | | | | |
| Gm | 20.0 | 18.0 | 16.0 | 14.6 | 12.6 | 11.6 | 9.6 | 2.5 |
| Wt. percent | 68.0 | 61.2 | 54.5 | 49.7 | 42.9 | 39.5 | 31.6 | 9.4 |
| Cloud Point, ° F | −6 | −10 | −9 | −7 | −4 | −2 | +1 | +31 |

By comparing the cloud points of aqueous solutions having approximately the same wt. percent of leveling additive, the following reduction in cloud point will be noted:

| Wt. Percent Leveling Additive, Approx. | 31 | 49 | 61 | 68 |
|---|---|---|---|---|
| Cloud Point, ° F.: | | | | |
| NH₄ Concentrate | +17 | +18 | +5 | −2.5 |
| Mg Concentrate | +1 | −7 | −10 | −6 |
| Reduction in Cloud Point | 16 | 25 | 15 | 3.5 |

Thus with respect to freezing temperature, the magnesium lauryl ether sulfate is the superior foaming agent.

Therefore, foam producing concentrates may be provided which can be stored indoors and outdoors.

As for example, foam producing concentrates may be formulated wherein the leveling additive is from about 1.5 to 2.1 parts by weight of the foaming agent and preferably from about 1.7 to 1.9 parts by weight of the foaming agent to provide a concentrate suitable for storage at temperatures above about 20° F. Examples (34) and (35), listed below, illustrate typical 20° F. formulations. Other foam producing concentrates may be formulated wherein the leveling additive is from about 2.1 to 3.3 parts by weight of the foaming agent and preferably from about 2.3 to 2.9 parts by weight of the foaming agent to provide a foam producing concentrate suitable for storage at temperatures above about 15° F. Examples (36) and (37), listed below, illustrate typical 15° F. formulations.

Still other foam producing concentrates may be formulated wherein the leveling additive is about 3.3 to 5.3 parts by weight of the foaming agent and preferably about 3.6 to 5.1 parts by weight of the foaming agent to provide a concentrate suitable for storage at temperatures above about 10° F. Examples (38) and (39), listed below, illustrate typical 10° F. formations.

| Examples | (34) | (35) | (36) | (37) | (38) | (39) |
|---|---|---|---|---|---|---|
| Formulation, °F | 20 | 20 | 15 | 15 | 10 | 10 |
| Mg Lauryl Ether Sulfate, wt. percent | 21.6 | 28.6 | 16.5 | 22.4 | 15.9 | 12.8 |
| Lauryl Alcohol, wt. percent | 3.0 | 5.3 | 2.5 | 4.2 | 3.0 | 2.4 |
| 1-butoxyethoxy-2-propanol, wt. percent | 36.4 | 55.0 | 38.5 | 64.6 | 57.3 | 65.5 |
| Water, wt. percent | 40.0 | 11.1 | 42.5 | 8.8 | 23.8 | 19.3 |
| Cloud Point, °F | 17 | 17 | 12 | 12 | 8 | 4 |

Still other foam producing concentrates may be formulated which are safe for storage at a temperature above about −20° F. Example (33), listed above, illustrates a typical −20° F. formulation wherein two leveling additives are present, namely, 1-butoxyethoxy-2-propanol and diethylene glycol monomethyl ether.

The following examples are intended to show that the present foam producing concentrates are unaffected by the hardness of the diluting water and therefore produce excellent foams.

For the purpose of comparison, Example IX of copending application Ser. No. 158,556, now U.S. Patent No. 3,186,943 is reproduced here as Example (40). In this example 363 grams of a 29% by weight aqueous solution of ammonium lauryl ether sulfate plus 9.3 grams of lauryl alcohol were diluted with 3.5 gallons of synthetic sea water (see Naval Aircraft Factory Process Spec. PS.-1, Navy Dept. Spec. 44T27B, dated July 1, 1940).

In Example (41) a 29% by weight aqueous solution magnesium lauryl ether sulfate, 4.3 grams of lauryl alcohol as the stabilizing additive and 80 grams of 1-butoxyethoxy-2-propanol as leveling additive Z were diluted with 2.5 gallons of synthetic sea water.

In Example (42), 84 grams of a 54% magnesium lauryl ether sulfate, 25% 1-butoxyethoxy-2-propanol and 21% water solution (expressed in percent by weight), was mixed with 5.7 grams of lauryl alcohol as the stabilizing additive and 100 grams of 1-butoxyethoxy-2-propanol as leveling additive Z and diluted with 3 gallons of synthetic sea water.

In Examplee (43), 84 grams of a 54% magnesium lauryl ether sulfate, 25% diethylene glycol monobutyl ether, and 21% water solution (expressed in percent by weight), was mixed with 5.7 grams lauryl alcohol as the stabilizing additive and 100 grams diethylene glycol monobutyl ether as leveling additive X, and diluted with 3 gallons of synthetic sea water.

| Examples | (40) | (41) | (42) | (43) |
|---|---|---|---|---|
| Foaming Agent: | | | | |
| NH₄ Lauryl Ether Sulfate: | | | | |
| Wt. gm | 105.0 | 38.0 | | |
| Conc.¹ | 800 | 400 | | |
| Mg Lauryl Ether Sulfate: | | | | |
| Wt. gm | | | 45.4 | 45.4 |
| Conc.¹ | | | 400 | 400 |
| Stabilizing Additive: | | | | |
| Weight, gm | 9.3 | 4.3 | 5.7 | 5.7 |
| Conc.¹ | 70 | 45 | 50 | 50 |
| Leveling Additive: | | | | |
| Type | None | Z | Z | X |
| Weight, gm | | 80 | 121 | 121 |
| Conc.¹ | | 840 | 1,060 | 1,060 |
| Diluted in, gal. of synthetic sea water | 3.5 | 2.5 | 3.0 | 3.0 |
| Initial Foam Weight, gm./liter | 2.27 | 2.30 | 1.84 | 1.81 |
| Foam Retained, wt. percent of initial foam weight | | | | |
| Drain Time, min.: | | | | |
| 4 | 87 | 98 | 99 | 99 |
| 7 | 67 | 89 | 91 | 90 |
| 10 | 56 | 81 | 80 | 81 |
| 15 | 43 | 68 | 61 | 61 |
| 30 | 26 | 46 | 42 | 40 |

¹ Concentration in mg./100 ml. of synthetic sea water.

Comparing Examples (40) and (41) both of which employed ammonium lauryl ether sulfate, it can be seen that although the initial foam weights are substantially identical, the addition of the leveling additive in Example (36) has reduced the drainage rate considerably.

Comparing Example (40) with Examples (42) and (43), it can be seen that the initial addition of the leveling additive has effected a reduction in the initial foam weights by approximately 24%. Further, the drainage rate has been reduced considerably.

Comparing Example (41) wherein ammonium lauryl ether sulfate was employed, with Examples (42) and (43) wherein magnesium lauryl ether sulfate was employed, it can be seen that the addition of the leveling additive has effected a reduction in the foam weight by approximately 26% while the drainage rates are substantially the same.

As can be seen by comparing Examples (42) and (43), 1-butoxyethoxy-2-propanol and diethylene glycol monobutyl ether are substantial equivalent leveling additives since they effect the foam produced in substantially the same way.

It thus has been shown that the present foam producing concentrates are uneffected by the hardness of the water. Consequently, the hardness of the water is not a factor to be considered in the present invention.

Although the present invention has been illustrated and described in connection with certain example formulations of the invention, it will be understood that those skilled in this art can make numerous formulation changes, additions, and variations to suit individual design preferences and it is intended that such variations and changes are within the scope of the present invention and are included within the terms of the following claims as equivalents of the invention.

We claim as our invention:

1. A composition for use in admixture with water for producing a high expansion fire fighting foam consisting of:
   (a) A foam concentrate of water and a foaming agent of the formula:

$$[R_a-(OR_b)_n-SO_4]-X$$

wherein $R_a$ is selected from the class consisting of lauryl and myristyl radicals, $R_b$ is selected from the class consisting of ethylene, trimethylene and methylethylene and X is a cation selected from the class consisting of ammonium, sodium, potassium, calcium, monoethyl amine, diethanol amine, triethanol amine and $n$ is an integer from 1 to 4, said foam concentrate containing from about 6 to about 25% by weight of the active foaming agent;
   (b) A stabilizing additive for said foam concentrate selected from the class consisting of lauryl alcohol and myristyl alcohol, said stabilizing additive comprising about 1 to 10% by weight of said foam concentrate;
   (c) One or more leveling agents in excess of 17% by weight of the concentrate selected from the group consisting of diethylene glycol monomethyl ether, diethylene glycol monoethyl ether, diethylene glycol monobutyl ether, dipropylene glycol monoethyl ether, and 1-butoxyethoxy-2-propanol.

2. A composition according to claim 1, wherein R is lauryl, R' is ethylene, the stabilizing agent is lauryl alcohol and the leveling agent is 1-butoxyethoxy-2-propanol.

3. A composition according to claim 2, wherein the cation is ammonium.

4. A composition according to claim 2 wherein the cation is magnesium.

5. A method of depressing the foamability of a foam yielding composition prior to the admixture of of said composition with water to produce a high expansion fire fighting foam and decreasing the weight of the resulting high expansion foam after admixture with water without affecting the foamability of the high expansion foam, which comprises adding to said foam yielding composition a leveling agent in excess of 10% by weight based on the weight of the foam yielding composition, said leveling agent selected from one or more the class consisting of diethylene glycol monomethyl ether, diethylene glycol monoethyl ether, diethylene glycol monobutyl ether, dipropylene glycol monoethyl ether, and 1-butoxyethoxy-2-propanol, said foam yielding composition consisting essentially of:

(a) A foam concentrate comprising water and a foaming agent of the formula

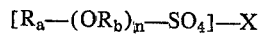
$$[R_a—(OR_b)_n—SO_4]—X$$

wherein $R_a$ is selected from the class consisting of lauryl and myristyl radicals, $R_b$ is selected from the class consisting of ethylene, trimethylene and methylethylene and X is a cation selected from the class consisting of ammonium, sodium, potassium, calcium, monoethyl amine, diethanol amine, triethanol amine and $n$ is 1 to 4, said foam cocentrate containing from about 6 to about 25% by weight of the active foaming agent;

(b) A stabilizing additive for said foam concentrate selected from the class consisting of lauryl alcohol and myristyl alcohol, said stabilizing additive comprising about 1 to 10% by weight of said foam concentrate.

References Cited

UNITED STATES PATENTS

| | | | |
|---|---|---|---|
| 2,766,212 | 10/1956 | Grifo | 252—352 |
| 2,861,956 | 11/1958 | Fernandez | 252—89 |
| 2,941,950 | 6/1960 | Korpe et al. | 252—89 |
| 2,971,458 | 2/1961 | Keemens et al. | 252—307 |
| 3,186,943 | 6/1965 | Barthauer | 252—3 |

FOREIGN PATENTS 582,988   12/1946   Great Britain.

OTHER REFERENCES

"New Foam is Faster Fire Fighter," Chemical Week, vol. 93, No. 5, Aug. 3, 1963, pp. 75, 76, 78.

MAYER WEINBLATT, *Primary Examiner.*

U.S. Cl. X.R.

252—8.05, 307, 89